United States Patent [19]
Knez et al.

[11] Patent Number: 4,588,108
[45] Date of Patent: May 13, 1986

[54] APPARATUS FOR DISPENSING SPHERICAL OBJECTS

[75] Inventors: Jordan Knez; Lars Gartnell, both of Halmstad, Sweden

[73] Assignee: Maskinverkstaden Jordan Knez, Halmstad, Sweden

[21] Appl. No.: 518,573

[22] Filed: Jul. 29, 1983

[30] Foreign Application Priority Data

Nov. 11, 1982 [SE] Sweden ............................... 8206402

[51] Int. Cl.[4] ............................................. G01F 9/00
[52] U.S. Cl. ......................................... 221/68; 221/93; 221/266; 221/289
[58] Field of Search ...................... 221/68, 93, 95, 196, 221/266, 296, 251, 175, 206-207, 252, 289

[56] References Cited

U.S. PATENT DOCUMENTS 2,479,878 8/1949 Strelzoff ........................... 221/68 X
3,417,542 12/1968 Merrill et al. .................... 221/93 X
3,587,925 6/1971 Keller .................................. 221/266
3,946,847 3/1976 Bock .................................. 221/93 X
4,057,172 11/1977 Olander .......................... 221/260 X
4,209,112 6/1980 Cottrell ................................ 221/93

FOREIGN PATENT DOCUMENTS 1037916 9/1978 Canada ............................... 221/251

*Primary Examiner*—Charles A. Marmor
*Attorney, Agent, or Firm*—Beveridge, DeGrandi & Weilacher

[57] ABSTRACT

The disclosure relates to an apparatus which is applicable such as, for example, an automatic golf ball dispenser, and comprises a ball magazine floor which consists of a number of tracks for golf balls so that these are arranged in rows after one another, the ends of the tracks being combined to form a pivotal cradle whose depth corresponds to one golf ball, whereby each pivoting of the cradle entails emptying of only that number of golf balls which is present in the cradle.

3 Claims, 3 Drawing Figures

APPARATUS FOR DISPENSING SPHERICAL OBJECTS

TECHNICAL FIELD

The present invention relates to an apparatus for dispensing a number of substantially spherical objects, for example golf balls, which includes a magazine for the spherical objects.

THE STATE OF THE ART

Such apparatuses are often used as golf ball dispensers on golf courses in such a manner that a golfer wishing to practice his drive may receive, from an automatic dispenser, a number of golf balls against payment in the form of coins or special types of counters. Prior art automatic ball dispensers have, however, proved to be unreliable such that the number of dispensed balls varies widely irrespective of the number of coins or counters paid. Moreover, prior art automatic dispensers are extremely complicated in construction and are, therefore, extremely costly both from the point of view of manufacture and of maintenance.

TECHNICAL PROBLEM

The task forming the basis of the present invention is to obviate or at least reduce the inconveniences inherent in prior art apparatuses of the above-outlined type.

SOLUTION

The task forming the basis of the present invention is solved in the apparatus disclosed by way of introduction, in that the floor of the magazine is inclined in relation to the horizontal plane and displays a number of parallel members extending in the direction of inclination and forming therebetween a path for a number of mutually subsequently arranged objects; and that the lowermost portion of the magazine floor with said members may be pivoted for separating the objects located thereon from the remaining objects located on the magazine floor. The width of the pivotal portion coincides in general with the size of the objects, such that these form a row in the pivotal portion. Means are provided above the magazine floor and ahead of the pivotal portion for purposes of arranging the objects so that no objects are located above one another in the proximity of the pivotal portion. Said means comprise a roller displaying spaced apart, elongate ridges on the circumferential surfaces, the distance between the circumferential surface and the magazine floor allowing the passage of the objects, whereas the ridges prevent passage of the objects. The magazine floor consists of a number of parallel rods which at the same time form said path forming means. At least the upper face of the rods is rounded and the distance between the rods is less than the diameter of the objects. The pivotal portion consists of parts of the rods in the magazine floor which form a continuation of the floor rods and are fixedly retained on L-shaped bars whose one shank forms the wall and whose other shank the roof, the L-shaped bar with the rod portion being pivotal about its longitudinal axis which extends into the connection between the shanks. Above the roof formed by the L-shaped bar, there is provided an arched surface which, during pivoting of the cradle formed by the rod portions and the L-shaped bar, retain the remaining objects in place on the floor rods.

An apparatus according to the present invention is of extremely simple construction, and, thereby, economical manufacturing costs and a great degree of reliability. An apparatus according to the present invention also makes for a cleansing of the balls, while prior art automatic devices require the provision of a special cleansing facility.

DESCRIPTION OF THE ACCOMPANYING DRAWING

The nature of the present invention and its aspects will be more readily understood from the following brief description of the accompanying drawing and discussion relating thereto. In the accompanying drawing, FIG. 1 is a schematic side elevation of a part of one embodiment of the apparatus according to the present invention.

DESCRIPTION OF PREFERRED EMBODIMENT

Figure 1:
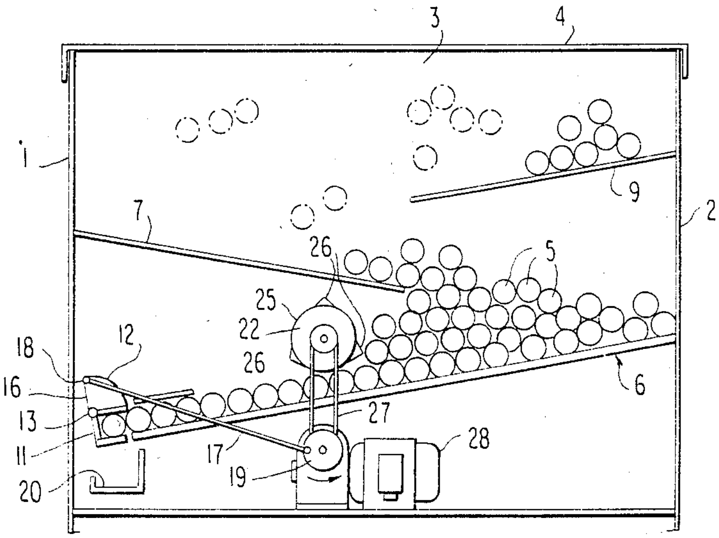
Figure 2:
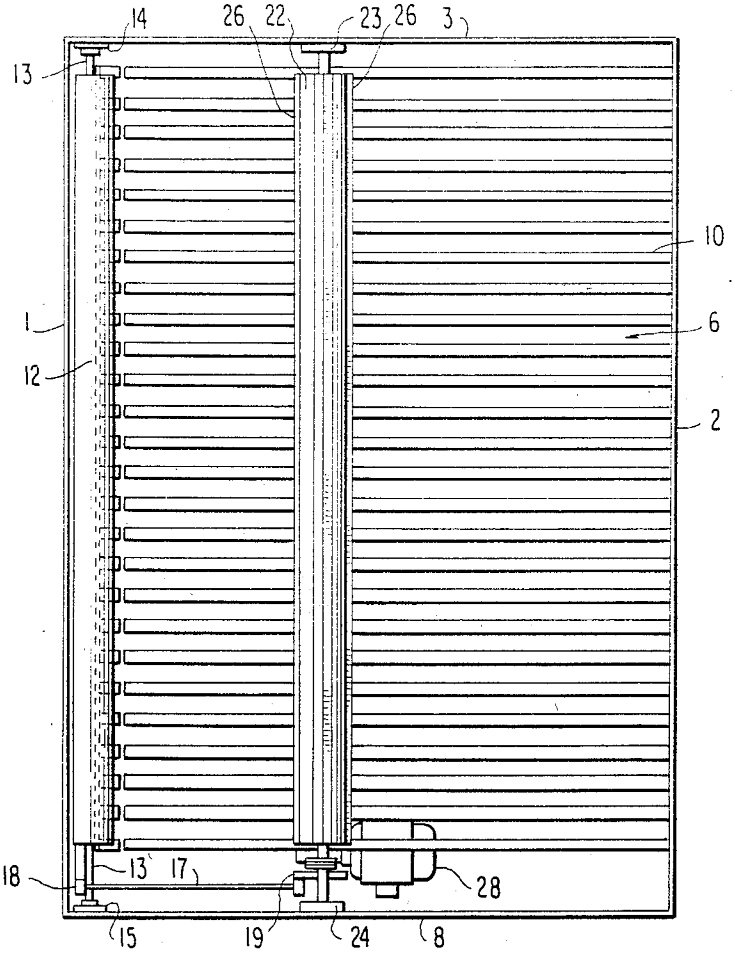
FIG. 2 is a top plan view of the portion illustrated in FIG. 1, certain parts having been removed.
Figure 3:
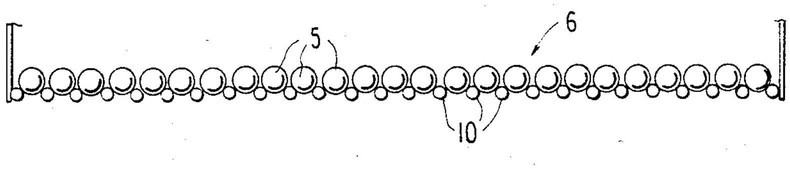
FIG. 3 is a partial view of a section of the floor with objects thereon.

The present invention will now be described in conjunction with its application in an automatic golf ball dispenser whose basic construction is illustrated in FIG. 1–3. In FIG. 1, there is only shown an upper portion of a box-shaped automatic golf ball dispenser and in FIG. 1 only the upper portion of walls 1, 2 and 3 are shown, as well as a removable lid or top 4. The walls 1, 2 and 3 may, if desired, extend down to a substrate and, in cases when the walls 1, 2 and 3 consists of sheet metal, these are anchored on a framework with legs which carry the entire dispenser. The lid or top portion 4 may, furthermore, be pivotal so that it may be opened for replenishing the automatic dispenser with balls 5. The balls 5 rest on a floor 6 in a ball magazine. In order that loading on the floor 6 be not too great, the magazine is provided with a relief floor 7 which is located most proximal the floor 6 and is fixedly retained in the wall 1 and the wall 3 and the opposing wall 8 to the wall 3, as illustrated in FIG. 2. A further relief floor 9 is fixedly retained in the wall 2 and the walls 3 and 8. Both of the relief floors 7 and 9, and the magazine floor 6 proper, are disposed at a certain angle of inclination. For example, at least the magazine floor 6 may be inclined at an angle of 10 degrees.

The magazine floor 6 consists of a number of spaced-apart parallel rods or tubes 10, as is more clearly illustrated in FIG. 3. The tubes 10 form tracks for the balls 5, and the balls 5 will roll along the tubes 10 down to a ball cradle at that end of the magazine floor 6 located most proximal the wall 1. The floor in the cradle may be considered as a continuation of the floor 6. The floor in the cradle thus consists of a number of parts of similar tubes 10 as the floor 6 and the tubular parts are, at one end, fixedly retained to one shank of an L-shaped bar 11 whose other shank forms a roof in the cradle. Above the roof shank of the L-shaped bar 11, there is disposed an arched surface 12 which extends along the entire cradle. The cradle is pivotally disposed about a shaft 13 which is pivotally journalled in bearings 14 and 15 on the side walls 3 and 8. The pivot shaft 13 extends into the connection between the shanks of the L-shaped bar 11. The arched surface 12 is, as has been mentioned above, fixedly retained to the top shank and to the edge facing away from the magazine, by means of support members 16.

Pivoting of the cradle is realised by means of an arm 17 whose one end is journalled at 18 in the cradle and whose other end is journalled on an excentric disk 19. Beneath the cradle, there is disposed a ball track 20 which is retained to the wall 1 with a slope from the wall 8 towards the wall 3 and which may extend beyond the wall 3 and discharge above, for example, a ball bucket. When the cradle is pivoted by means of the arm or rod 17, the row of balls located in the cradle will be emptied into the track 20 and thereafter roll out into the bucket or container at its end. The arched surface 12 will retain the remaining balls on the magazine floor 6. A flat bar 21 is disposed above the balls located most proximal the cradle and prevents the balls from climbing on one another if they are forced back by the arched surface 12 up along the magazine floor 6.

In the magazine floor 6, in a direction ahead of the cradle, there is disposed, slightly above the magazine floor 6, a roller 22 which is journalled in bearings 23 and 24 on the walls 3 and 8. The distance between the circumferential surface 25 of the roller and the magazine floor 6 is adapted such that the balls 5 are allowed passage, as illustrated in FIG. 1. On its circumferential surface, the roller 22 is provided with ridges 26 which are of such elevation that, when they are located in register with the floor 6, they prevent the passage of golf balls 5. When the roller 22 rotates, the ridges 26 thereon will, thus, each time they pass a position in register with the floor 6, force the golf balls in a rearward direction, whereby the golf balls will, on the one hand, be arranged in a suitable manner between the rods 10, and, on the other hand, be subjected to a certain cleansing action. The roller 22 is positively coupled, by the intermediary of a belt or chain 27, to the same shaft as the excentric disk, this shaft being driven by an electric motor 28 via a worm gear.

If the distance between the relief floor 7 and the roller 22 is so great that the balls 5 may pass between them, there may be disposed on the underface of the relief floor 7, a wall portion which extends towards the roller 22 so that the balls 5 may not jump over the roller.

Suitably, the electric motor 28 is driven via an electronic circuit which, in its turn, is regulated by means of a coin-operator, or a special automatic acceptance device for counters, the electronic circuit being arranged such that insertion of a counter causes the wheel 19 to rotate one revolution and thereby pivot the cradle and empty 25 golf balls 5 into the track 20. In the present case, the apparatus is, thus, operative to discharge 25 balls 5 for each single revolution of the wheel 19. When the wheel 19 rotates, the roller 22 will also rotate and arrange the balls 5 before these have reached the cradle. While FIG. 3 illustrates a number of 25 balls for each pivoting of the cradle, there is, naturally, nothing to prevent certain parts of the cradle and the magazine floor 6 from being shut off, so that only 10 or 15 balls are allowed passage into the cradle.

For attaining an improved cleansing effect, it is, naturally not inconceivable that the ridges 26 be provided with brushes or be replaced by brushes. Thanks to the space between the rods or tubes 10, all dirt will fall down beneath the floor 6 and, in many cases, it is fully conceivable to allow the apparatus to stand free on a substrate so that it is a matter of no inconvenience to remove the dirt which passes the floor rods 10. There may very well be provided a sheet metal tray, between the wall 3 and the most proximal tube 10 in the floor 6, the tray preventing balls 5 from falling down between the wall 3 and the adjacent tube 10. The same may also apply to the opposing wall 8. Such walls are intimated in FIG. 3 and the height thereof, as well as their possible sloping out towards the walls 3 and 8, are adapted to suit each individual case. It should, here, be further observed that the ridges 26 on the roller circumferential surface 25 may be more or less than three, as illustrated in FIG. 1, but the distance between two ridges may, naturally, not be so small that the ball 5 is not free on any given occasion.

We claim:

1. An apparatus for discharging a number of golf balls (5) comprising a magazine for said golf balls (5) said magazine having a floor (6) being inclined in relation to a horizontal plane and including a number of parallel rods (10) extending in the direction of the inclination, the distance between said rods (10) being less than the diameter of said golf balls (5) for providing therebetween a path for a number of mutually subsequently located golf balls, a portion of said magazine floor being pivotal for separating the golf balls located thereon from the remaining golf balls on said magazine floor (6), wherein said pivotal portion further comprises parts of said rods (10) in said magazine floor (6), forming a continuation of the floor rods and being fixedly retained in an L-shaped bar (11) having a shank which forms a wall and having another shank which forms a roof and wherein said L-shaped bar (11) with said rod portions is pivotal about its longitudinal axis (13) which extends in the position of interconnection between said shanks.

2. The apparatus according to claim 1, further comprising said rod portions and said L-shaped bar (11) forming a cradle provided with an arched surface (12) for retaining the most proximally balls (5) on said rods (10) during pivoting of the cradle for emptying of the same.

3. An apparatus for discharging a number of golf balls comprising a magazine for said golf balls (5), said magazine having a floor (6) being inclined in relation to the horizontal plane and formed of a number of parallel rods (10) extending in the direction of inclination, and forming therebetween a path for a number of mutually subsequently located golf balls, the upper face of said rods being rounded and wherein the distance between said rods is less than the diameter of said golf balls, and wherein the lowermost portion of said magazine floor with said rods is pivotal for separating the golf balls located thereon from the remaining golf balls located on the magazine floor, the pivotal portion comprising parts of said rods in said magazine floor, forming a continuation of the floor rods and being fixedly retained in an L-shaped bar (11) whose one shank forms a wall and whose other shank forms a roof and wherein said L-shaped bar with said rod portions is pivotal about its longitudinal axis (13) which extends in the position of interconnection between said shanks.

* * * * *